United States Patent [19]
Reinicke et al.

[11] Patent Number: 5,868,375
[45] Date of Patent: Feb. 9, 1999

[54] MAGNETOSTRICTIVELY ACTUATED VALVE

[75] Inventors: Robert H. Reinicke, Mission Viejo, Calif.; Derek Tate Schappell, Morristown, N.J.

[73] Assignee: Marotta Scientific Controls, Inc., Montville, N.J.

[21] Appl. No.: 791,594

[22] Filed: Jan. 31, 1997

Related U.S. Application Data

[63] Continuation of Ser. No. 540,919, Oct. 11, 1995, abandoned.

[51] Int. Cl.$^6$ .................................................. F16K 31/06
[52] U.S. Cl. .................................. 251/129.21; 251/129.06
[58] Field of Search ........................ 251/129.15, 129.06, 251/129.21, 129.01; 335/279, 281, 274, 215

[56] References Cited

U.S. PATENT DOCUMENTS

| | | |
|---|---|---|
| 3,174,716 | 3/1965 | Salter . |
| 3,414,010 | 12/1968 | Sparrow . |
| 4,158,368 | 6/1979 | Clark .................................... 137/487.5 |
| 4,298,181 | 11/1981 | Corrado et al. . |
| 4,437,644 | 3/1984 | Wilmers . |
| 4,695,034 | 9/1987 | Shimizu et al. . |
| 4,720,077 | 1/1988 | Minours et al. . |
| 4,750,706 | 6/1988 | Schlagmüller ..................... 251/129.06 |
| 4,932,439 | 6/1990 | Mc Auliffe ......................... 137/625.65 |
| 5,046,701 | 9/1991 | Barber . |
| 5,085,400 | 2/1992 | Petersen . |
| 5,094,430 | 3/1992 | Shirai et al. . |
| 5,148,735 | 9/1992 | Veletovac . |
| 5,217,037 | 6/1993 | Bristol ............................ 251/129.06 X |
| 5,222,713 | 6/1993 | Lawless et al. . |
| 5,249,117 | 9/1993 | Greenough et al. . |
| 5,267,589 | 12/1993 | Watanabe . |
| 5,280,773 | 1/1994 | Henkel . |
| 5,318,064 | 6/1994 | Reinicke . |
| 5,318,268 | 6/1994 | Cox et al. . |
| 5,354,032 | 10/1994 | Sims et al. . |
| 5,375,811 | 12/1994 | Reinicke et al. . |
| 5,381,817 | 1/1995 | Gassman et al. . |
| 5,501,425 | 3/1996 | Renicke et al. . |
| 5,516,042 | 5/1996 | Gerstengerer . |
| 5,518,184 | 5/1996 | Potz et al. . |
| 5,520,522 | 5/1996 | Rathore et al. . |
| 5,647,390 | 7/1997 | Wass . |

FOREIGN PATENT DOCUMENTS

| | | |
|---|---|---|
| 0 029 129 | 5/1981 | European Pat. Off. . |
| 0 512 521 A1 | 11/1992 | European Pat. Off. . |
| 85/02445 | 6/1985 | WIPO . |
| 95/25920 | 9/1995 | WIPO . |

*Primary Examiner*—Kevin Lee
*Attorney, Agent, or Firm*—Lerner, David, Littenberg, Krumholz & Mentlik

[57] ABSTRACT

A valve construction relies upon solenoid-driven axial elongation of an annular magnetostrictive core element for opening displacement of an elongate poppet-valve member that is carried within the annulus of the core element. A first stiffly compliant preload independently urges the poppet-valve member into its seated position of lock-up at valve closure, and a second stiffly compliant preload independently prestresses the annular magnetostrictive core element into a fixed referencing abutment with valve-body structure. The currently preferred material of the core is Terfenol-D, which offers a strong elongation response to inductively coupled excitation. The elongation response is sufficient to serve the purposes of (1) closing a pretravel clearance prior to a flange engagement with the poppet-valve member and (2) also, via the flange engagement, displacing the poppet-valve member out of its normal valve-closing engagement with the valve seat. In the preferred embodiments, inlet and outlet ports for the valve are centered at the respective axial ends of the valve-body structure.

80 Claims, 3 Drawing Sheets

MAGNETOSTRICTIVELY ACTUATED VALVE

RELATED CASE

This application is a continuation of original application Ser. No. 08/540,919, filed Oct. 11, 1995, now abandoned.

BACKGROUND OF THE INVENTION

The invention relates to a valve construction wherein solenoid excitation of an elongate magnetostrictive core element is relied upon to actuate a valve for control of fluid flow, as for controlling the flow of a pressure fluid from an upstream source to an outlet for downstream storage or utilization at reduced pressure.

Pending application Ser. No. 309,776, filed Sep. 21, 1994 now U.S. Pat. No. 5,501,425 issued Mar. 26, 1996 describes several embodiments of magnetostrictive valves of the character indicated, with specific utility and application to spacecraft, wherein the valve is necessarily of normally closed variety and a very high seating force is desired, to provide positive sealing and very low leakage under lock-up (i.e. valve-closed) conditions. Pressurized propellant gas for maneuvering must be conserved at all costs, relying upon valves with superior (i.e., very low) leakage resistance under lock-up conditions, yet offering fast response to instant demand. Thus, shut-off, isolation, low friction, mechanical simplicity and small size are important considerations in a valve of the character indicated. A magnetically latching and magnetically actuated valve of the nature described in U.S. Pat. No. 3,814,376 or in pending application Ser. No. 08/184,484 now U.S. Pat. No. 5,375,811 issued Dec. 27, 1994 has properties approaching the desired low-leakage of a valve-closed condition, but the time constant for valve actuation (opening or closing) is greater than would be desired, and the seating force is less than desired.

The disclosure of said pending application Ser. No. 309,776 is hereby incorporated by reference, and it suffices here to note that all of the disclosed embodiments of said application relied upon a central cylindrical core element of magnetostrictive material, forming part of a toroidal path of magnetic flux, wherein the toroidal path surrounds an excitation winding. One axial end of the core element has reference to the valve housing, and the other axial end is poised to drive an actuating stem into abutment with and valve-opening displacement of a valve member which is otherwise spring-loaded into its closed relation of engagement with a valve seat. Disc washers or Belleville springs are utilized for axial-force preloading and to center component parts for minimum friction and/or mechanical hysteresis, but the constructions are more than is believed strictly necessary. Moreover, inlet and outlet parts serve valve-chamber regions at one axial end of magnetostrictive actuating system.

BRIEF STATEMENT OF THE INVENTION

It is an object of the invention to provide an improved valve construction of the character indicated.

A specific object is to provide a valve construction having superior lock-up properties of sealing against leakage of pressure fluid for the valve-closed condition.

Another specific object is to meet the above objects with a basically simple miniaturizable configuration, having application for control of propellant gas stored under high pressure for use in maneuvered orientation of a spacecraft.

A further specific object is to meet the above objects with a construction having a fast time constant of valve opening and closing, and exhibiting inherently little mechanical hysteresis, under a wide range of ambient temperature conditions and offering a fail safe condition of superior valve lock-up against leakage of pressure fluid.

It is a general object to meet the above objects with simpler construction offering economies of manufacture without sacrifice of performance capability.

The invention achieves these objects in a valve construction which relies upon solenoid-driven axial elongation of an annular magnetostrictive core element, for opening displacement of an elongate poppet-valve member that is carried within the annulus of the core element. A first stiffly compliant preload independently urges the poppet-valve member into its seated position of lock-up at valve closure, and a second stiffly compliant preload independently prestresses the annular magnetostrictive core element into a fixed referencing abutment with valve-body structure. The currently preferred material of the core is Terfenol-D, which offers a strong elongation response to inductively coupled excitation. The elongation response is sufficient to serve the purposes of (1) closing a pretravel clearance prior to a flange engagement with the poppet-valve member and (2) also, via the flange engagement, displacing the poppet-valve member out of its normal valve-closing engagement with the valve seat. In the preferred embodiments, inlet and outlet ports for the valve are centered at the respective axial ends of the valve-body structure.

In the present description, for convenience of reference, the central axis of the valve system will be sometimes referred to as "horizontal", extending from a left or inlet-end port, to a right or outlet-end port. But it is to be understood that a "horizontal" orientation is no more significant than the "vertical" orientations shown for the embodiments of said pending application Ser. No. 309,776, in that valve operation is not in any sense dependent upon any relation to the instantaneous gravity vector.

BRIEF DESCRIPTION OF THE DRAWINGS

Preferred and illustrative embodiments of the invention will be described in detail, in conjunction with the accompanying drawings, in which.

DETAILED DESCRIPTION

Figure 1:
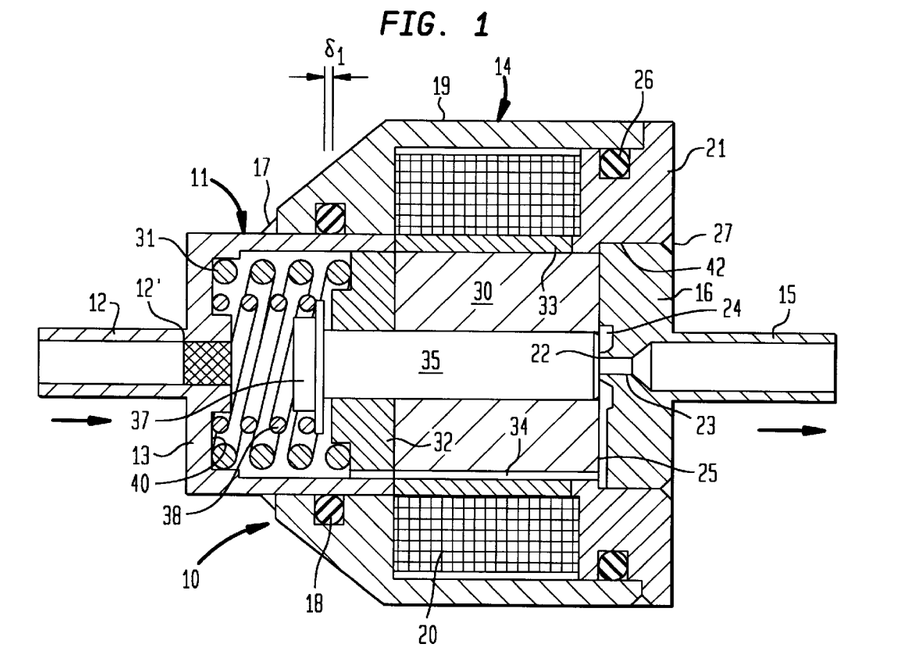
FIG. 1 is a view in longitudinal section of a first valve embodiment of the invention, shown for the closed condition of the valve.
Figure 2:
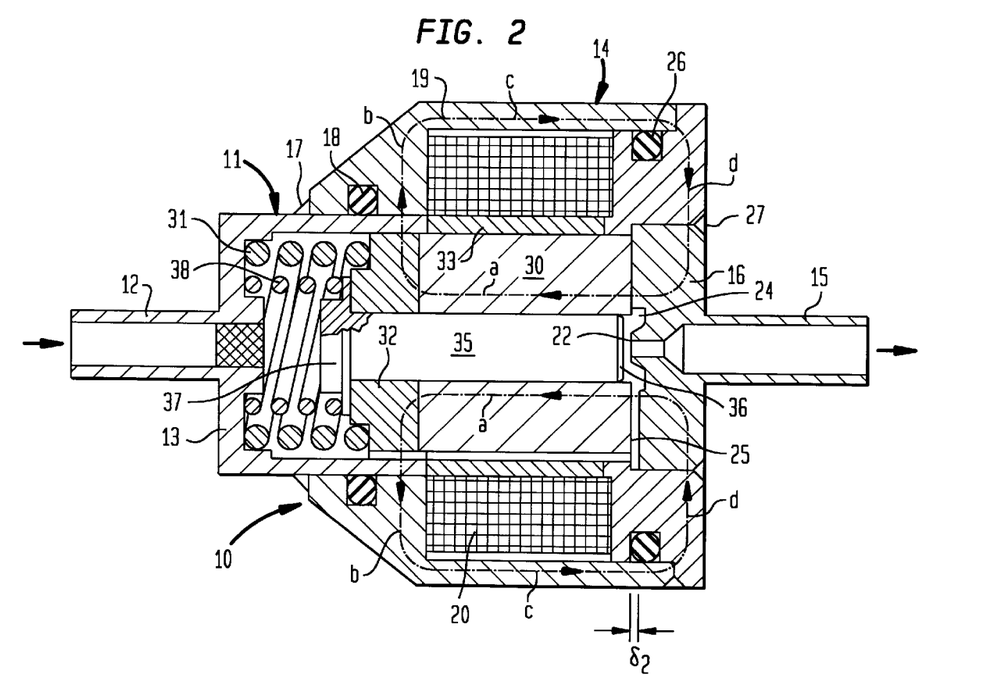
FIG. 2 is a view as in FIG. 1 for an actuated condition of the valve, with schematic indication of the flow of electromagnetically induced excitation flux.

Referring initially to the embodiment of FIGS. 1 and 2, the invention is shown to comprise a body 10, consisting of an upstream cup-shaped part 11 having a central inlet-port connection 12 to its closed left-end wall 13, and annular downstream parts 19, 21, 33, collectively marked 14, and having a central outlet-port connection 15 to a closed right-end wall 16. The body parts 11, 16, 19 and 21 are of ferromagnetic material, and the part 33 is an inner sleeve of a material which is not ferromagnetic. The part 19 is an outer sleeve or skirt portion of body 10 and has an inwardly flanged upstream end which telescopically laps the upstream body part 11; the body parts 11, 19 are shown connected by a circumferential weldment 17, the overlapping engagement being additionally sealed by an elastomeric O-ring 18. An inlet filter 12' in port 12 assures that particles borne by inlet pressure-fluid flow will not impair valve operation.

More specifically, the outer sleeve or skirt part 19 of body part 14 features a counterbore for reception and location of a winding or solenoid coil 20. The inner sleeve 33 provides coaxial support of winding 20, and the downstream annulus 21 closes the counterbore for axial retention of winding 20. The downstream end-wall part 16 seats against the inner end of a counterbore in annulus 21 and is centrally formed at its upstream end with an annular valve-seat configuration, which surrounds a passage to outlet port 15 and which projects from an annular manifolding concavity. One or more radial grooves 25 communicate inlet-gas flow to the manifold 24.

It is important to the invention that the end-closure walls 13, 16 shall be securely connected to withstand internal axially compressional loading of valve parts yet to be described. This can be done by circumferentially welding the fit of parts 19, 21 to each other and by providing a circumferential weld 27 of end-wall part 16 to the annulus 21; however, in the preferred arrangement shown in FIGS. 1 and 2, parts 19, 21 have only an axially extending telescopic fit that is sealed by an elastomeric O-ring 26, and the material of inner sleeve is selected not only for its non-ferromagnetic properties, but also for its compatibility with the ferromagnetic material of axially adjacent parts 11, 21 for welding purposes. Suitably, the material of ferromagnetic body parts 11, 19, 21, 16 is magnetic-quality stainless steel, and the material of non-magnetic sleeve 33 is an austenitic stainless steel (such as 304L), circumferentially welded at both axial ends, as suggested by thickened lines of connection to parts 11 and 21 in FIGS. 1 and 2. After such welding of sleeve 33, a single continuous bore is defined and is preferably finish-ground after the described welding of sleeve 33 and prior to assembly of internal valve components (yet to be described) and of the downstream end-closure part 16. It will be understood that once these internal valve components have been assembled, and end-closure part 16 has been welded at 27 to annulus 21, the continuously finished bore within welded parts 11, 33, 21 establishes an axially direct continuous permanent interconnection of the end-closure walls at 13 and 16.

In accordance with a feature of the invention, a cylindrical annulus or core 30 of magnetostrictive material is retained, preferably with close clearance, within the continuous bore of parts 11, 33 and 21; and a stiffly compliant spring 31, seated within body part 11, applies prestressing compressional force, via a shouldered (and preferably ferromagnetic) plate 32, to the upstream end face of the magnetostrictive annulus 30. The fit of parts 30, 32 to the described continuous bore of parts 11, 33, 21 will be understood to be sufficiently loose, to allow for magnetostrictive elongation of part 30, pursuant to electrical excitation of coil 20. As best seen in FIG. 2, such excitation of coil 20 establishes toroidal circulation of magnetic flux, via inductive coupling to the magnetostrictive part 20 along an inner axial path leg a, with resultant path completion radially outward via a path leg b, an outer axial path leg c, and back to path leg a via a radially inward path leg d.

One or more longitudinal grooves 34 in the periphery of plate 32 and of core 20 align with the one or more radial grooves 25 of body-closure wall 16, to provide for pressure fluid (e.g. gas) communication from inlet port 12 to the manifold 24.

An elongate cylindrical poppet-valve member 35 has guided support for limited longitudinal displaceability from its normally closed downstream-end contact with the valve-seat formation 22. Preferably, this downstream end of the valve member is coated or otherwise finished with a closure pad or coating 30 of elastomeric material such as nylon or Teflon*. And valve member or poppet 35 features a radial-flange formation 37 at its upstream end for shouldered reception of stiffly compliant preloading force, shown to be provided by a coil spring 38 that is nested within the prestressing spring 31 and independently referenced to the body-closure wall 13.

A trademark of the DuPont Company.

The normally closed valve condition of FIG. 1 reveals, with some exaggeration, an axial clearance or pretravel allowance $\delta_1$, to assure the independent action of spring 38, for fail-safe closure of poppet end 36 against the annular rim of seat 22. This pretravel allowance must be overcome by magnetostrictive elongation of core element 30, in response to a sufficient electrical excitation of winding 20, before the magnetostrictive elongation can further be expected to lift the poppet-valve element 30 into a valve-opening axial clearance $\delta_2$ from seat 22. Thus, the total elongation of element 30 is the sum of $\delta_1$ and $\delta_2$; but, for the indicated usage in spacecraft applications, the values of these axial clearances are indeed small, in view of flow rates of 0 to 12 mg/sec, for the case of Xenon as the pressure fluid. With proper choice of materials, the extent of pretravel clearance (i.e. thermal-stroke error) can be reduced to near-zero, in view of the fact that in use, the stem of the poppet-valve member 35 and the magnetostrictive core element 30 will be at essentially the same steady-state temperature. At present, a preference is stated for use of a magnetostrictive material known as Terfenol-D as the material of core element 30; this is a specially formulated alloy of terbium, dysprosium and iron, and it is commercially available from Etrema Products, Inc., of Ames, Iowa. Preferably, the material of poppet-valve member 35 has substantially the same temperature coefficient of expansion as the material of core element 30; and for the indicated use of Terfenol-D, the desired substantial match of thermal coefficients results from use of the titanium alloy Ti-6Al-4V as the material of valve member 35, thereby effectively neutralizing the effects of differential thermal expansion of parts 30/35, and reducing allowance for pretravel $\delta_1$ to near-zero.

As with ferromagnetic body parts 11, 14 (19, 21, 16), plate 32 is also suitably of magnetic-quality stainless steel. And the bore of plate 32 may have a coating of Teflon or other low-friction material for smooth axially slidable displaceability with respect to the upstream (i.e. flanged) end of poppet 30. Preferably also, winding 20 is itself a subassembly, pre-potted in suitable plastic and defining a solid cylindrical annulus, with precisely spaced end-wall surfaces, and with a bore having a closely supporting fit to the nonmagnetic sleeve 33.

Figure 3:
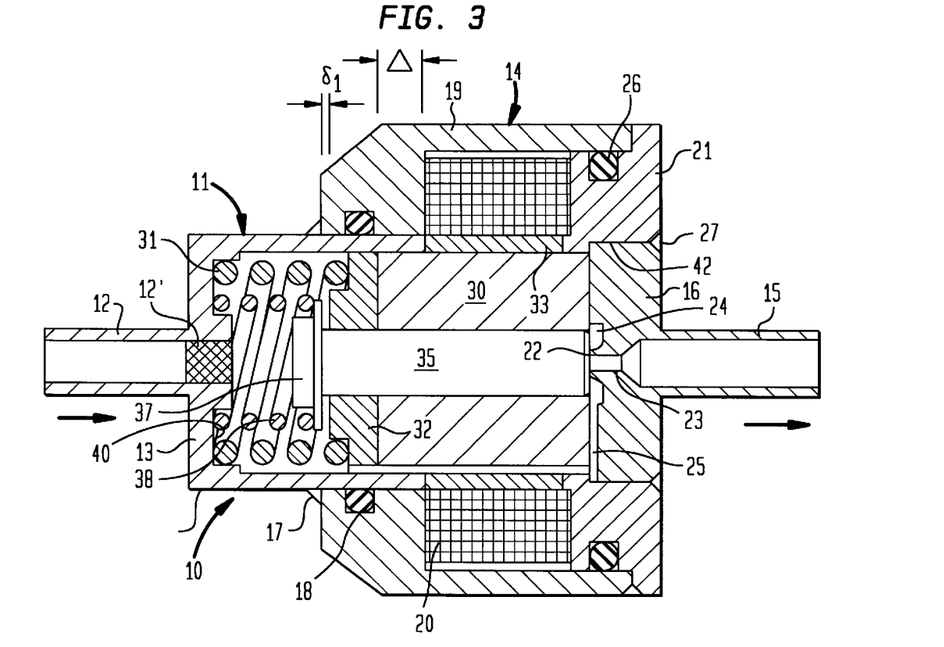
FIG. 3 is a view similar to FIG. 1, for a modified construction, shown for the closed condition of the valve.
Figure 4:
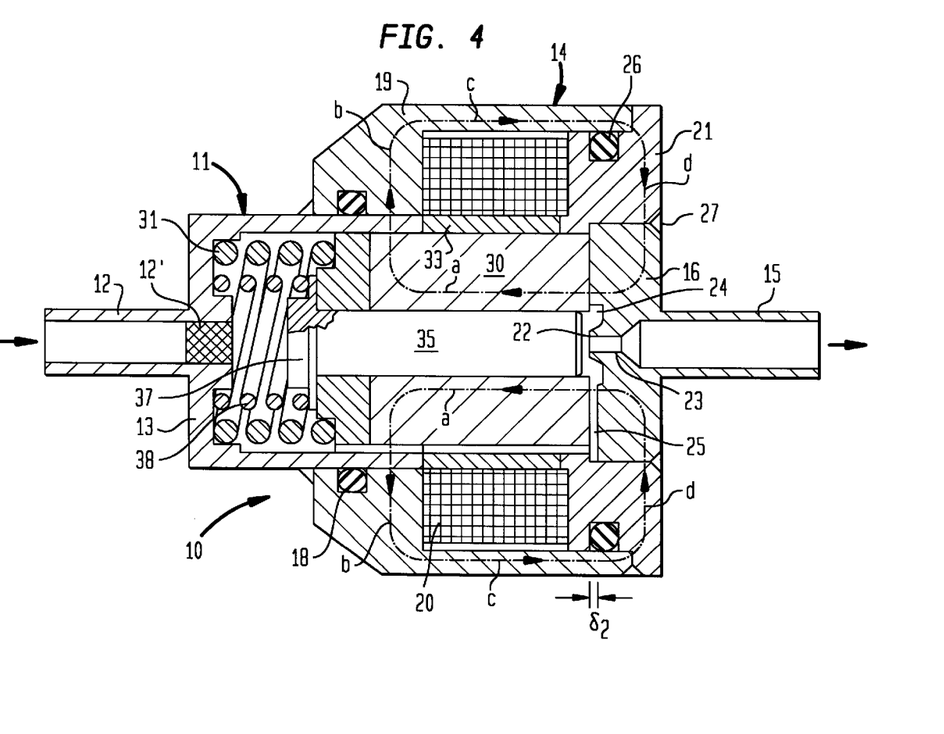
FIG. 4 is a view as in FIG. 3 for an actuated condition of the valve of FIG. 3.

The modification of FIGS. 3 and 4 will be seen to closely correspond with the embodiment of FIGS. 1 and 2, and, therefore, identical reference numbers have been used for both embodiments, as far as possible. The difference in FIGS. 3 and 4 is that the length of body part 19 has been slightly extended to provide a region $\Delta$ of axial-end overlap of core element 30 within the ferromagnetic body parts 11 and 19, in which case plate 32 need not be of magnetic-quality stainless steel, in that the toroidal path of magnetic flux, upon excitation of winding 20, can avoid reliance upon plate 32, as schematically indicated in FIG. 4.

In the description thus far, it will be appreciated that the reference to body parts 11 and 14, as being telescopically or otherwise fitted shapes, has been for convenience purposes, in that the main point is that the magnetostrictive core element 30 shall be the axially extending portion of the toroidal flux path established via the body parts, upon excitation of the winding 20 which is enclosed within the toroidal flux path.

Figure 5:
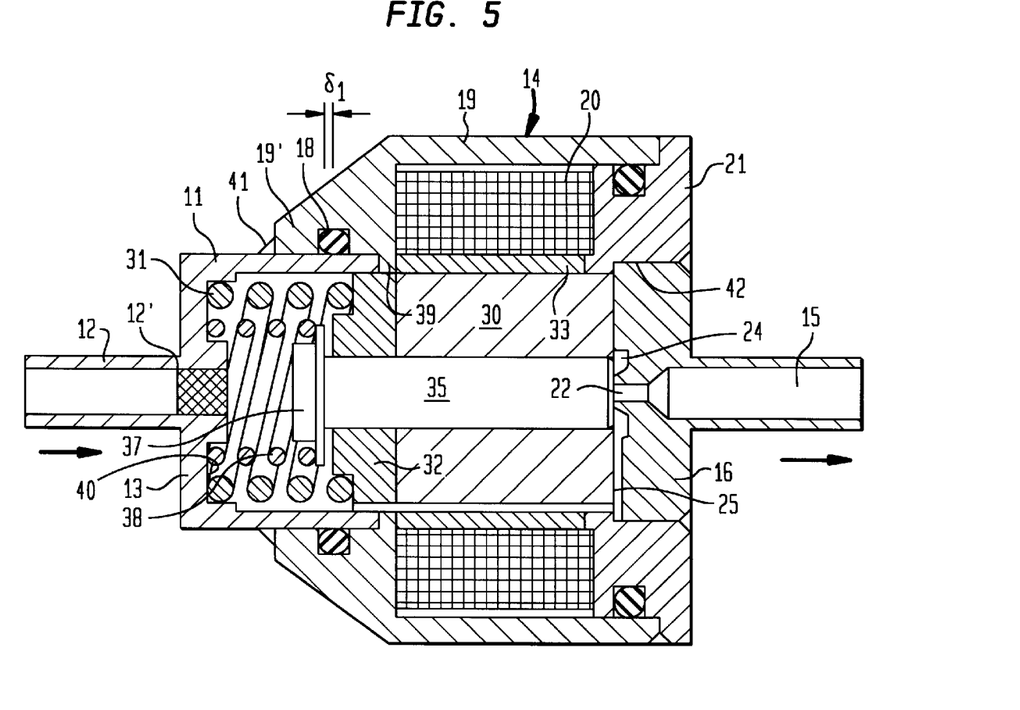
FIG. 5 is another view similar to FIG. 1, for another modification.

For mechanical assembly purposes, the central axis of the upstream body part 11 is advisedly oriented vertically, so as to present an upwardly open skirt, for axial reception of the independent springs 31, 37 and for their coaxial location by radially spaced shoulders of the annularly grooved profile 40 of the inner wall of end closure 13. This upwardly open skirt may be a sub-assembly which includes the outer body part 19, permanently welded (at 41, FIG. 5); the axially limiting position of such a sub-assembly of parts 11 and 19 is best seen in FIG. 5, where the body part 19' has a radially inward flange 39 for axially limiting abutment with the skirt of body member 11, prior to welding at 41. In this connection, part 19 may advisedly have been pre-assembled with winding 20, sleeve 33, and body-ring part 21, with permanently welded connection of parts 19 and 21 via sleeve 33, thus presenting a clean open cavity into which poppet 35 and its flange 37 can be inserted for its shoulder location of engagement to spring 38, and into which plate 32 can be inserted for its shoulder location of engagement to spring 31. At this point, the way is clear for insertion of core element 30 over the stem of poppet 35 and within the aligned bores of ring 21 and sleeve 33. All that remains is for the downstream end-closure body part 16 to be inserted into the counterbore 42 of ring 21 and for application of axially compressive force to the point of achieving a fully seated relation of part 16 at the bottom of counterbore 42, at which point, both of springs 31 and 38 will have been preloaded, and the weld 27 may be applied, to complete a permanent assembly of the valve.

Figure 6:
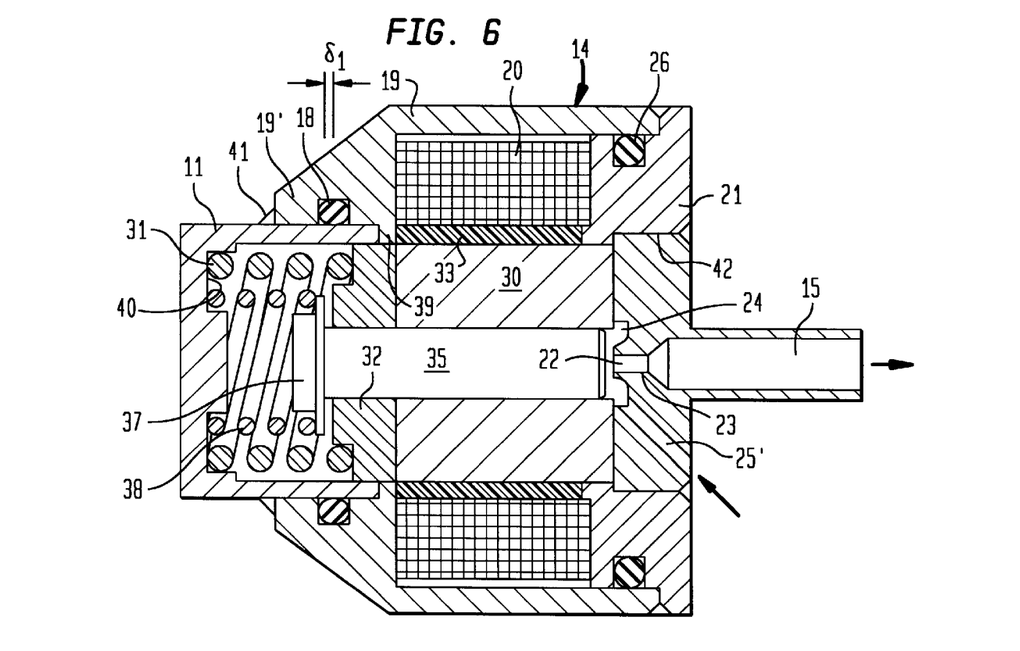
FIG. 6 is a further view similar to FIG. 1, for a further modification.

FIG. 6 serves to illustrate that the non-magnetic sleeve 33 may be a separate plastic component; preferably, however, the potting in which winding is consolidated (as explained above) takes place within a cavity (not shown) having an inner cylindrical surface such that sleeve 33 is produced as an integral feature of the potted winding, with a precision bore that is capable of providing axially elongate, low-friction, cylindrical support of core element 30. Of course, the use of plastic as the material of sleeve 33 means that sleeve 33 in FIG. 6 cannot be relied upon as a means of connecting parts 19 and 21, under the prestressing and preload conditions expected of springs 31, 38; therefore in FIG. 6, the desired establishment of axially rigid connection of end-closure walls at 13 and 16 is via a circumferential weld 28 of the lapped fit of parts 19, 21 to each other.

FIG. 6 also serves to illustrate that the inlet and outlet ports for pressure-fluid flow controlled by the valve may both exist at a single axial end of the valve, thereby avoiding need for the grooves 25/34 of FIGS. 1 to 5.

Specifically, in FIG. 6, the end closure 16 is shown with an inlet passage 25' having direct communication with the annular manifold 24 which surrounds the annular valve-seat formation 22. Structure, assembly and operation may otherwise be as described for FIG. 5 and the other embodiments.

The described constructions will be seen to meet all stated objects and to provide a simplified collocation of elemental parts which lend themselves to facile assembly and reliable performance. In particular, all necessary clearances and preloads are automatically achieved for the method of assembly which has been described, and no further adjustments are needed. It is particularly notable that the two independently operative springs are in nested radial clearance with each other; that they each derive compressive reference from the single end-closure wall 13; and that the other closure wall 16 of the body or housing 11, 14 provides reactive reference for the prestressed core element 30 and for the valve-seat formation 22, in the normally closed condition of the valve. When winding 20 is sufficiently excited, magnetostrictive elongation of core element 30 is a jacking action wherein core member 20 has axial-abutment reference to the said other closure wall 16; the jacking action opens the valve by axially "lifting" poppet 35 upon core member (20) engagement with the flanged end of the poppet, against the preloading force of spring 38.

What is claimed is:

1. An electrically operated normally-closed valve construction, comprising a generally tubular housing of ferromagnetic material with a closure wall at each of the axial ends of said housing, said housing having spaced inlet and outlet ports one of which is centered through one of said closure walls, an annular seat formation on the inner surface of said one closure wall and surrounding said one port, a cylindrical annulus of magnetostrictive material surrounding said seat formation and in compliantly prestressed axial abutment with said one closure wall, an electrical winding contained within said housing and surrounding said cylindrical annulus of magnetostrictive material, a poppet member axially guided within said annulus of magnetostrictive material, said poppet member being configured at one axial end for valve-closing coaction with said seat formation, and said poppet member being configured with a flange formation at its opposite axial end for retracting said poppet member away from seat engagement, upon excitation of said winding with resulting magnetostrictive axial elongation of said cylindrical annulus.

2. The valve construction of claim 1, in which a first coil spring is positioned for reaction between the other closure wall and said annulus of magnetostrictive material for prestressing the magnetostrictive material in said compliantly prestressed axial abutment, and in which a second coil spring in nested radial clearance within said first coil spring is positioned for reaction between said other closure wall and the flanged end of said poppet member for axially preloading said poppet member in the direction of valve-closing coaction with said seat formation.

3. The valve construction of claim 1, in which said housing comprises first and second cup-shaped parts having axially overlapping skirt portions, the outer one of which has an inwardly open cavity for containment of said winding.

4. The valve construction of claim 3, in which the inner one of said skirt portions contains first axially compliant prestressing means reacting between the other of said closure walls and said cylindrical annulus of ferromagnetostrictive material for establishing the prestress of said cylindrical annulus at abutment with said one closure wall.

5. The valve construction of claim 4, in which an annular disc of ferromagnetic material is axially interposed between said cylindrical annulus of magnetostrictive material and said first prestressing means and said disc includes a shoulder formation for centering engagement with said first prestressing means.

6. The valve construction of claim 4 in which said first axially compliant prestressing means is a coil spring.

7. The valve construction of claim 4, in which the inner one of said skirt portions contains a second prestressing spring reacting between the other of said closure walls and the flanged end of said poppet member.

8. The valve construction of claim 7, in which the flanged end of said poppet member has a shoulder formation for centering engagement with said second prestressing spring.

9. The valve construction of claim 4, in which said cylindrical annulus of magnetostrictive material extends axially into lapped relation with a radially inward annular-flange formation of the outer one of said skirt portions to establish toroidal completion of flux-path continuity around said winding and via said outer skirt portion and the prestressed abutment of said cylindrical annulus with said one closure wall.

10. The valve construction of claim 4, in which a cylindrical annular disc of ferromagnetic material is axially interposed between prestressing means and said cylindrical annulus of magnetostrictive material and has axially lapped relation with a radially inward annular flange formation of the outer one of said skirt portions to establish toroidal completion of flux-path continuity around said winding and via said outer skirt portion and the prestressed abutment of said cylindrical annulus with said one closure wall.

11. An electrically operated normally-closed valve construction, comprising a generally tubular housing of ferromagnetic material having a central longitudinal axis extending between upstream and downstream ends, with a ported closure wall at each of the axial ends of said housing; an elongate cylindrically annular magnetic-core element of magnetostrictive material supported by and within said housing concentric with said axis, and first compliant means reacting between the upstream-end wall and said core element for axially preloading said core element in continuously prestressed abutment with said downstream-end wall; an elongate poppet-valve member guided by and within said core element and having a radial-flange formation at its upstream end in radial lap of the upstream end of said core element, and second compliant means reacting between the upstream-end wall and said poppet-valve member for independently and continuously axially preloading said poppet-valve member in the direction of valve-closing seated relation with the ported closure wall at the downstream end of said housing; an electrical excitation winding retained by said housing in inductively coupled relation with said core element; and ferromagnetic means including portions of said housing for completing with said core element a toroidal flux path enveloping said winding, whereby to develop a magnetostrictive elongation of said core element and, via said flange formation, a valve-opening displacement of said poppet-valve member.

12. The valve construction of claim 11, in which said first and second compliant means are independent coil springs in radially spaced and axially lapped nested relation.

13. The valve construction of claim 12, in which said upstream-end wall has internal shoulder formations which respectively locate adjacent ends of said springs in radially spaced relation.

14. The valve construction of claim 12, in which an annular plate element axially interposed between said core element and said first spring has a shoulder for concentric location of said first spring.

15. The valve construction of claim 14, in which said annular plate is of ferromagnetic material and constitutes a completing portion of said toroidal flux path.

16. The valve construction of claim 11, in which the material of said poppet member and the material of said core element have substantially the same thermal coefficient of expansion.

17. The valve construction of claim 11, in which the material of said magnetostrictive core element is an alloy of terbium, dysprosium and iron.

18. The valve construction of claim 11, in which the material of said magnetostrictive core element is Terfenol-D.

19. The valve construction of claim 17, in which the material of said poppet member is a titanium alloy.

20. The valve construction of claim 19, in which the titanium alloy is Ti-6Al-4V.

21. The valve construction of claim 11, in which the axial proportions of said core element and of said poppet-valve member are such as to develop at least some axial pretravel clearance between said flange and said core element in the normally closed condition of said valve.

22. The valve construction of claim 11, in which said downstream-end wall has an annular valve seat poised for poppet-valve engagement for establishing the normally closed condition of said valve.

23. The valve construction of claim 22, in which the downstream end of said poppet member carries an elastomeric material for valve-closing engagement with the part of said closure wall at the downstream end of said housing.

24. An electrically operated normally-closed valve construction, comprising a generally tubular housing of ferromagnetic material having a central longitudinal axis, with a closure wall at each of the axial ends of said housing, one of said closure walls having a discharge passage between upstream and downstream ends thereof and centered on said axis; said one closure wall having a generally radial internal face with (i) an annular seat formation concentric with the upstream end of said passage, and (ii) with an annular manifolding groove concentrically surrounding said seat formation, and (iii) with an inlet-port passage communicating with said manifolding groove; an elongate cylindrically annular magnetic-core element of magnetostrictive material supported by and within said housing concentric with said axis, arid first compliant means reacting between the other of said end walls and said core element for axially preloading said core element in continuously prestressed abutment with said one closure wall; an elongate poppet-valve member guided by and within said core element and having one end for valve coaction with said annular seat formation and having a radial-flange formation at its other end, with said radial-flange formation in radial lap of said core element, and second compliant means reacting between said other end wall and said poppet-valve member for independently and continuously axially preloading said poppet-valve member in the direction of valve-closing relation with said annular seat formation; an electrical excitation winding retained by said housing in inductively coupled relation with said core element; and ferromagnetic means including portions of said housing for completing with said core element a toroidal flux path enveloping said winding, whereby to develop a magnetostrictive elongation of said core element and, via said flange formation, a valve-opening displacement of said poppet-valve member.

25. An electrically operated normally-closed valve construction, comprising an elongate generally tubular housing portion having a central longitudinal axis and having spaced end closures which with said housing portion define an elongate cylindrical cavity; said housing portion including an intermediate annular section of non-ferromagnetic metal circumferentially welded at its opposite ends to first and second annular sections of ferromagnetic material, said annular sections providing an axially rigid connection of said end closures to each other; one of said end closures having a discharge passage between upstream and downstream ends thereof and centered on said axis; said one end closure having a generally radial internal face with (i) an annular seat formation concentric with the upstream end of said passage, and (ii) with an annular manifolding groove concentrically surrounding said seat formation, and said housing having an inlet passage which is in communication with said manifolding groove; an elongate cylindrically annular magnetic-core element of magnetostrictive material supported by and within said housing in coaxial overlap with said intermediate section and with axial-abutment reference to said one end closure; first compliant means within said cavity and reacting between the other of said end closures and said core element for axially preloading said core element in a continuously prestressed abutment relation with said one end closure; an elongate cylindrically annular magnetic-core element of magnetostrictive material supported by and within said housing concentric with said axis, and first compliant means reacting between the other of said end walls and said core element for axially preloading said core element in continuously prestressed abutment with said one closure wall; an elongate poppet-valve member guided by and within said core element and having one end for valve coaction with said annular seat formation and having a radial-flange formation at its other end, with said radial-flange formation in radial lap of said core element, and second compliant means reacting between said other end wall and said poppet-valve member for independently and continuously axially preloading said poppet-valve member in the direction of valve-closing relation with said annular seat formation; an electrical excitation winding retained by said housing in inductively coupled relation with said core element; and ferromagnetic means including portions of said housing for completing with said core element a toroidal flux path enveloping said winding, whereby to develop a magnetostrictive elongation of said core element and, via said flange formation, a valve-opening displacement of said poppet-valve member.

26. The valve construction of claim 25, in which the inlet passage is a feature of the other end closure, with internal communication of said inlet passage to said manifolding groove.

27. The valve construction of claim 25, in which the inlet passage is a feature of said one end closure, with communication of said inlet passage to said manifolding groove.

28. A valve comprising:
a valve housing having a cavity and at least one inlet port and at least one outlet port operatively positioned therein;
a poppet, operatively positioned in the cavity, for selectively opening and closing the at least one outlet port;
a valve seat, operatively positioned in the valve housing and in fluid communication with the at least one inlet port and the at least one outlet port, for cooperating with the poppet during selective opening and closing of the outlet port;
a magnetostrictive member, operatively positioned in the valve housing and operative to selectively move the poppet relative to the valve seat;
a first spring, operatively positioned in said housing, for prestressing said magnetostrictive material;
a second spring operatively positioned proximate to said first spring, for axially preloading said poppet member in the direction of valve closing coaction with said valve seat; and
a winding, operatively positioned in the housing and at least partially surrounding the magnetostrictive member, for forming a magnetic circuit such that the length of the magnetostrictive member is selectively varied by the excitation of the winding wherein the poppet position relative to the valve seat is correspondingly varied.

29. The valve of claim 28 wherein the magnetostrictive member comprises: Terfenol-D.

30. The valve of claim 28 further comprising:
means for controlling the position of the poppet through a range of modulated valve-open conditions.

31. The valve of claim 30 wherein the poppet position controlling means further comprises:
modulated excitation of the winding.

32. The valve of claim 28 wherein the housing comprises:
first and second cup-shaped parts having axially overlapping skirt portions, the outer one of which has an inwardly open cavity for containment of the winding.

33. The valve of claim 28 wherein the poppet is supported by the second part in a first compliantly preloaded relation of seated closure of the central opening within an inlet chamber.

34. The valve of claim 29 wherein the poppet further comprises:
a flange formation at its opposite axial end for retracting the poppet away from valve seat engagement upon excitation of the winding with resulting axial elongation of the magnetostrictive member.

35. The valve of claim 28 wherein the valve housing further comprises:
a generally tubular housing of ferromagnetic material with a closure wall at each of the axial ends of the housing with one of the ports being centered through one of the closure walls.

36. The valve of claim 35 wherein the valve seat further comprises:
an annular seat formation on the inner surface of one of the closure walls and surrounding at least one of the ports.

37. The valve of claim 36 wherein the magnetostrictive member further comprises:
a cylindrical annulus of magnetostrictive material surrounding the seat formation and in compliantly prestressed axial abutment with one of the closure walls.

38. The valve of claim 37 wherein the poppet is axially guided within the annulus of the magnetostrictive element.

39. The valve of claim 32 the inner one of the skirt portions contains first axially compliant prestressing means reacting between the other of said closure walls and a cylindrical annulus of ferromagnetostrictive material for establishing the prestress of the cylindrical annulus at abutment with the one closure wall.

40. The valve of claim 39 wherein an annular disc of ferromagnetic material is axially interposed between the cylindrical annulus of magnetostrictive material and the first prestressing means and the disc includes a shoulder formation for centering engagement with the first prestressing means.

41. The valve of claim 40 wherein the inner one of the skirt portions contains a second prestressing spring reacting between the other of the closure walls and the flanged end of the poppet.

42. The valve of claim 41 wherein the flanged end of the poppet has a shoulder formation for centering engagement with the second prestressing spring.

43. The valve of claim 28 wherein the valve seat is normally closed.

44. The valve of claim 28 wherein the material of the magnetostrictive element is an alloy of terbium, dysprosium and iron.

45. The valve of claim 28 wherein the material of the magnetostrictive element is Terfenol-D.

46. The valve of claim 28 wherein the material of the poppet is a titanium alloy.

47. The valve of claim 46 wherein the titanium alloy is Ti-6Al-4V.

48. A valve for controlling fluid flow comprising:

a valve housing having a cavity and at least one inlet and at least one outlet operatively positioned therein;

a poppet, operatively positioned in the cavity, for selectively opening and closing the at least one outlet;

a valve seat, operatively positioned in the valve housing and in fluid communication with the at least one inlet and the at least one outlet, for cooperating with the poppet during selective opening and closing of the outlet;

a magnetostrictive member, operatively positioned in the valve housing and operatively connected to the poppet, for selectively moving the poppet relative to the valve seat; and excitation winding means, operatively positioned in the valve housing and at least partially surrounding the magnetostrictive member, for forming a magnetic circuit such that excitation of the magnetostrictive member actuates the poppet for control of the fluid flow through the outlet.

49. The valve of claim 48 wherein the magnetostrictive means comprises: Terfenol-D.

50. The valve of claim 48 further comprising:

means for controlling the position of the poppet through a range of modulated valve-open positions.

51. The valve of claim 50 wherein the poppet position controlling means further comprises:

modulated excitation of the winding means.

52. A valve comprising:

a valve housing having a cavity and at least one inlet port and at least one outlet port operatively positioned therein;

a poppet, operatively positioned in the cavity, for selectively opening and closing the at least one outlet port, said poppet including a flange formation at its axial end opposite said outlet port;

a valve seat, operatively positioned in the valve housing and in fluid communication with the at least one inlet port and the at least one outlet port, for cooperating with the poppet during selective opening and closing of the outlet port;

a magnetostrictive member comprising Terfenol-D, operatively positioned in the valve housing and operative to selectively move the poppet relative to the valve seat;

a first spring, operatively positioned in said housing, for prestressing said magnetostrictive material;

a second spring operatively positioned proximate to said first spring, for axially preloading said poppet member in the direction of valve closing coaction with said valve seat; and a winding, operatively positioned in the housing and at least partially surrounding the magnetostrictive member, for forming a magnetic circuit such that the length of the magnetostrictive member is selectively varied by the excitation of the winding wherein the poppet position relative to the valve seat is correspondingly varied by means of said flange formation of said poppet.

53. A valve comprising:

a valve housing having a cavity and at least one inlet port and at least one outlet port operatively positioned therein, said valve housing comprising a generally tubular housing of ferromagnetic material with a closure wall at each of the axial ends of said housing with one of said inlet and outlet ports being centered through one of said closure walls;

a poppet, operatively positioned in the cavity, for selectively opening and closing the at least one outlet port;

a valve seat, operatively positioned in the valve housing and in fluid communication with the at least one inlet port and the at least one outlet port, for cooperating with the poppet during selective opening and closing of the outlet port;

a magnetostrictive member, operatively positioned in the valve housing and operative to selectively move the poppet relative to the valve seat;

a first spring, operating positioned in said housing, for prestressing said magnetostrictive material;

a second spring operatively positioned proximate to said first spring, for axially preloading said poppet member in the direction of valve closing coaction with said valve seat; and a winding, operatively positioned in the housing and at least partially surrounding the magnetostrictive member, for forming a magnetic circuit such that the length of the magnetostrictive member is selectively varied by the excitation of the winding wherein the poppet position relative to the valve seat is correspondingly varied.

54. A valve comprising a valve housing including a cavity, an inlet port and an outlet port, a valve seat associated with one of said inlet and outlet ports, a poppet positioned within said cavity for selectively moving between a first position in contact with said valve seat whereby said one of said inlet and outlet ports is closed and a second position displaced from said valve seat whereby said one of said inlet and outlet port is open, a first spring actively prestressing said poppet into one of said first and second positions, an actuator having a first end and a second end defining a predetermined length therebetween, excitation means for exciting said actuator and causing said predetermined length of said actuator to increase, thereby increasing the distance between said first and second ends of said actuator, a second spring for actively prestressing said actuator and maintaining said first end of said actuator at a predetermined position within said cavity, said second end of said actuator being operatively engageable with said poppet whereby upon excitation of said actuator said second end of said actuator overcomes the active prestressing of both said first and second springs and causes said poppet to move to said other of said first and second positions.

55. The valve of claim 54 wherein said actuator comprises a magnetostrictive material.

56. The valve of claim 54 wherein said second end of said actuator is normally displaced from said poppet by a predetermined distance, whereby said predetermined distance must normally be overcome by an excitation of said actuator before said actuator operatively engages said poppet.

57. The valve of claim 54 wherein the coefficient of thermal expansion of said actuator and the coefficient of thermal expansion of said poppet are selected such that their relative positions are substantially unaffected by temperature changes.

58. The valve of claim 54 including means for controlling the position of said poppet through a range of modulated valve open conditions.

59. The valve of claim 54 wherein said poppet includes a flange portion, and wherein said first spring is operatively engaged with said flange portion of said poppet.

60. The valve of claim 54 wherein said valve seat comprises an annular seat formation surrounding said one of said inlet and outlet ports.

61. The valve of claim 54 wherein said actuator is annular, and wherein said poppet is axially positioned within said annular actuator for movement therein.

62. The valve of claim 61 wherein said actuator comprises a magnetostrictive material.

63. The valve of claim 54 including an abutment member interposed between said actuator and said second spring.

64. The valve of claim 54 wherein said abutment member includes a shoulder for centering of said second spring.

65. A valve comprising a valve housing including a cavity, an inlet port and an outlet port, a valve seat associated with said outlet port, a poppet positioned within said cavity for selectively moving between a first position in contact with said valve seat whereby said port is closed and a second position displaced from said valve seat whereby said port is open, a first spring means actively prestressing said poppet into said first position, an actuator having a first end and a second end defining a predetermined length therebetween, excitation means for exciting said actuator and causing said predetermined length of said actuator to increase, thereby increasing the distance between said first and second ends of said actuator, a second spring for actively prestressing said actuator and maintaining said first end of said actuator at a predetermined position within said cavity, said second end of said actuator being operatively engageable with said poppet whereby upon excitation of said actuator said second end of said actuator overcomes the active prestressing of both said first and second springs and causes said poppet to move to said second position.

66. The valve of claim 65 wherein said actuator comprises a magnetostrictive material.

67. The valve of claim 65 wherein said second end of said actuator is normally displaced from said poppet by a predetermined distance, whereby said predetermined distance must normally be overcome upon excitation of said actuator before said actuator operatively engages said poppet.

68. The valve of claim 65 wherein the coefficient of thermal expansion of said actuator and the coefficient of thermal expansion of said poppet are selected such that their relative positions are substantially unaffected by temperature changes.

69. The valve of claim 65 including means for controlling the position of said poppet through a range of modulating valve open conditions.

70. The valve of claim 65 wherein said actuator is annular, and wherein said poppet is axially positioned within said annular actuator for movement therein.

71. The valve of claim 70 wherein said actuator comprises magnetostrictive material.

72. A valve comprising a valve housing including a cavity, an inlet port and an outlet port, a valve seat associated with one of said inlet and outlet ports, an elongated poppet positioned within said cavity for selectively moving between a first position in contact with said valve seat whereby said one of said inlet and outlet ports is closed and a second position displaced from said valve seat whereby said one of said second outlet ports is open, a spring for actively prestressing said poppet into one of said first and second positions, an annular actuator surrounding said elongated poppet and including a first end and a second end defining a predetermined length therebetween, excitation means for exciting said actuator and causing said predetermined length of said actuator to increase, thereby increasing the distance between said first and second ends of said actuator, said second end of said actuator being operatively engageable with said poppet whereby upon excitation of said actuator said second end of said actuator overcomes the active prestressing of said spring and causes said poppet to move to said other of said first and second positions.

73. The valve of claim 72 wherein said actuator comprises a magnetostrictive material.

74. The valve of claim 72 wherein said second end of said actuator is normally displaced from said poppet by a predetermined distance, whereby said predetermined distance must normally be overcome upon excitation of said actuator before said actuator actively engages said poppet.

75. The valve of claim 73 wherein the coefficient of thermal expansion of said actuator and the coefficient of thermal expansion of said poppet are selected such that their relative positions are substantially unaffected by temperature changes.

76. The valve of claim 72 including means for controlling the position of said poppet through a range of modulated valve open positions.

77. The valve of claim 72 wherein said poppet includes a flange portion, and wherein said first spring is operatively engaged with said flange portion of said poppet.

78. The valve of claim 72 wherein said valve seat comprises an annular seat formation surrounding one of said inlet and outlet ports.

79. The valve of claim 72 wherein said actuator is annular, and wherein said poppet is axially positioned within said annular actuator for movement therein.

80. The valve of claim 79 wherein said actuator comprises magnetostrictive material.

* * * * *

UNITED STATES PATENT AND TRADEMARK OFFICE
CERTIFICATE OF CORRECTION

PATENT NO. : 5,868,375
DATED : February 9, 1999
INVENTOR(S) : Reinicke et al.

It is certified that error appears in the above-identified patent and that said Letters Patent is hereby corrected as shown below:

Column 4, line 16, before "A" insert --*--.

Column 8, line 37, "arid" should read --and--.

Column 10, line 47, after "32" insert --wherein--.

Column 12, line 21, "operating" should read --operatively--.

Column 14, line 33, "73" should read --72--.

Signed and Sealed this

Third Day of August, 1999

Q. TODD DICKINSON

Attest:

*Attesting Officer*   *Acting Commissioner of Patents and Trademarks*